(12) United States Patent
Attard et al.

(10) Patent No.: US 11,686,251 B1
(45) Date of Patent: Jun. 27, 2023

(54) PRE-CHAMBER SPARK CONTROL WITH TWO IGNITION SOURCES

(71) Applicants: William P Attard, Brighton, MI (US); Shawali Chaudhury, Rochester Hills, MI (US); Qun Wei, Troy, MI (US)

(72) Inventors: William P Attard, Brighton, MI (US); Shawali Chaudhury, Rochester Hills, MI (US); Qun Wei, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/729,709

(22) Filed: Apr. 26, 2022

(51) Int. Cl.
*F02C 7/26* (2006.01)
*F02C 7/264* (2006.01)
*F02P 17/12* (2006.01)

(52) U.S. Cl.
CPC .............. *F02C 7/264* (2013.01); *F02P 17/12* (2013.01); *F05D 2270/313* (2013.01); *F05D 2270/709* (2013.01)

(58) Field of Classification Search
CPC .............. F02C 7/264; F05D 2270/313; F05D 2270/709; F02P 17/12; F02P 5/15; F02P 15/02; F02P 15/08
See application file for complete search history.

(56) References Cited

U.S. PATENT DOCUMENTS

| | | | | |
|---|---|---|---|---|
| 3,776,212 A | * | 12/1973 | Karlowitz | ............... F02B 19/08 123/259 |
| 5,709,189 A | * | 1/1998 | Monnier | ............... F02F 1/4214 123/260 |
| 8,857,405 B2 | | 10/2014 | Attard | |
| 9,353,674 B2 | | 5/2016 | Bunce et al. | |
| 9,732,664 B2 | | 8/2017 | Trinkel | |
| 10,161,296 B2 | | 12/2018 | Schock et al. | |
| 10,196,997 B2 | | 2/2019 | Merlino et al. | |
| 10,612,454 B2 | | 4/2020 | Bedogni et al. | |
| 10,947,919 B1 | | 3/2021 | Charbonnel et al. | |
| 11,125,203 B1 | | 9/2021 | Attard et al. | |
| 11,187,142 B2 | | 11/2021 | Schock et al. | |
| 2019/0264621 A1 | * | 8/2019 | Hagari | .................. F02D 11/105 |

* cited by examiner

*Primary Examiner* — Syed O Hasan
(74) *Attorney, Agent, or Firm* — Ralph E. Smith

(57) ABSTRACT

A combustion control system and method for a turbulent jet ignition engine is presented. A controller is configured to access a trained feedforward artificial neural network (ANN) configured to model a first spark from a first ignition source and maximum brake torque (MBT) based on measured operating parameters, generate the first spark and MBT using the ANN, generate a second spark from a second ignition device, and determine a target spark timing. The ANN can be further configured to receive an input related to spark stagger.

20 Claims, 5 Drawing Sheets

PRE-CHAMBER SPARK CONTROL WITH TWO IGNITION SOURCES

FIELD

The present application generally relates to spark ignition (SI) engines and, more particularly, to techniques for determining both a pre-chamber and a secondary spark ignition timing for an engine having turbulent jet ignition (TJI).

BACKGROUND

In today's internal combustion engines, the spark timing with respect to the respective piston strokes affects the quality of combustion. It is therefore desirable to accurately determine and control the spark timing because poor combustion quality due to inaccurate spark timing could result in decreased fuel economy and/or engine knock. An internal combustion engine that incorporates turbulent jet ignition (TJI) typically includes a pre-chamber with a first spark plug inside. A second spark plug is often mounted in an offset position in the main combustion chamber. Flame is initiated inside the pre-chamber and jets into the main combustion chamber to ignite the bulk fuel air mixture. In conventional internal combustion engines with a single spark plug in each cylinder (or multiple-spark plugs firing at the same time), torque can be estimated by multiplying engine maximum potential torque and torque efficiency. With a turbulent jet ignition (TJI) engine, however, there exists both a pre-chamber ignition from the first spark plug and a secondary ignition from the second spark plug. In this regard, both the pre-chamber and the secondary ignition timings have an influence on torque efficiency. Accordingly, there remains a need for improvement in the relevant art to properly account for both ignition timings associated with a TJI engine when determining torque.

SUMMARY

According to one example aspect of the invention, a combustion control system for a TJI engine is presented. In one exemplary implementation, the TJI engine has a first ignition device disposed in a pre-chamber of a cylinder head and a second ignition device disposed for communication with a main combustion chamber. In some implementations, the controller is configured to: access a trained feedforward artificial neural network (ANN) configured to model a first spark from the first ignition device, a maximum brake torque (MBT) spark based on operating parameters; generate the first spark and the MBT spark for the engine using the ANN; generate a second spark for the second ignition device; determine a target spark timing for the engine based on at least one of the first spark, second spark and MBT spark.

According to some implementations, the second spark is modeled from the ANN. In some implementations, the ANN is defined by four layers including an input layer, two hidden layers with twelve neurons per layer, and an output layer.

According to other implementations, the controller is further configured to determine a spark stagger corresponding to a difference between the first and second spark timing. In some implementations, the spark stagger is based on a two-dimensional surface having engine speed and air charge mass as inputs. In implementations, the controller is also configured to access the ANN that is further configured to model the spark stagger. In implementations, the controller is further configured to generate the first spark and the MBT spark for the engine using the ANN from the operating parameters from the set of sensors and the spark stagger as inputs. In implementations, the second spark is generated based on a difference between the spark stagger and the first spark timing. In implementations, the ANN is defined by four layers including an input layer, two hidden layers with thirteen neurons per layer, and an output layer. In implementations, the operating parameters comprise at least six parameters including air charge mass and temperature, intake and exhaust camshaft positions, engine speed, and engine coolant temperature.

According to another example aspect of the invention, a combustion control method for a TJI engine is presented. In one exemplary implementation, the TJI engine has a first ignition device disposed in a pre-chamber of a cylinder head and a second ignition device disposed for communication with a main combustion chamber. In one exemplary implementation, the method comprises: receiving, by a controller of the vehicle, measured operating parameters from a set of sensors; accessing, by the controller, an ANN configured to model a first spark from the first ignition device, and maximum brake torque (MBT) spark based on the measured operating parameters, by the controller and from a set of sensors, measured parameters; generating, by the controller, the first spark, and the MBT spark for the engine using the ANN with the measured parameters from the set of sensors as inputs; generating, by the controller, a second spark for the second ignition device; determining, by the controller, a target spark timing for the engine based on at least one of the first spark, second spark and MBT spark.

According to some implementations, the method further includes: generating, by the controller, the second spark using the ANN. In implementations, the ANN is defined by four layers including an input layer, two hidden layers with twelve neurons per layer, and an output layer. In other implementations, the method further includes: determining, by the controller, a spark stagger corresponding to a difference between the first and second spark timing. In implementations, the spark stagger is based on a two-dimensional surface having engine speed and air charge mass as inputs. In implementations, the method further includes: accessing, by the controller, the ANN that is further configured to model the spark stagger. In implementations, the method further includes: generating, by the controller, the first spark, and the MBT spark for the engine using the ANN with six measured parameters and the spark stagger as inputs. In implementations, the second spark is generated based on a difference between the spark stagger and the first spark timing. In implementations, the ANN is defined by four layers including an input layer, two hidden layers with thirteen neurons per layer, and an output layer.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, there remains a need for improvement in the relevant art to properly account for both pre-chamber and secondary spark ignition timings associated with a TJI engine when determining engine torque. The methods and techniques discussed herein address engine spark estimation for a TJI engine having two independent ignition timings. As will be described in detail herein, the present methods provide solutions to control both pre-chamber and secondary spark ignition timings by using a trained feedforward artificial neural network (ANN). A first ANN models pre-chamber spark, secondary (side) spark and maximum brake torque (MBT) spark timing based on operating parameters. In one non limiting example, the operating parameters include six inputs: intake and exhaust camshaft positions, mass and temperature of an air charge being provided to each cylinder of the SI engine, engine speed and engine coolant temperature (ECT). MBT is a maximum torque realized at optimum engine speed and air charge. As can be appreciated if the engine is operating at MBT, the torque efficiency would be 100%. As will be discussed in greater detail herein, a second ANN model is also disclosed that is based on seven inputs including the six inputs used for the first ANN and an additional stagger input.

Figure 1:
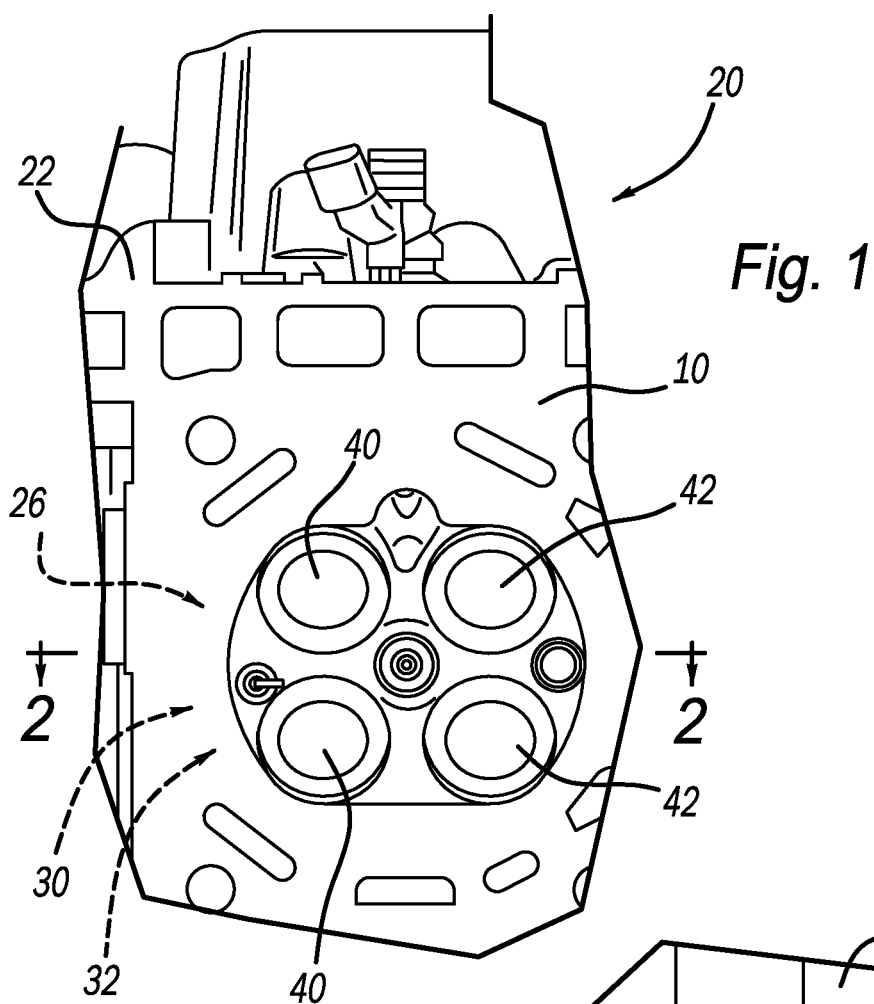
FIG. 1 is an elevational view of a cylinder head of an exemplary TJI engine according to the principles of the present disclosure.
Figure 2:
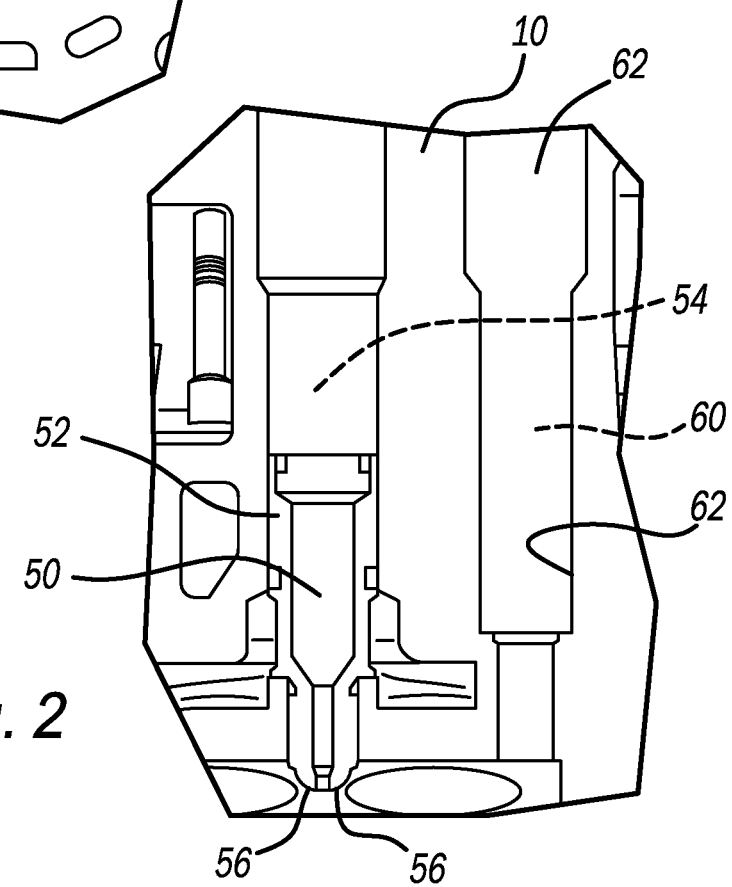
FIG. 2 is a cross-sectional view taken along lines 2-2 of FIG. 1.

With initial reference to FIGS. 1 and 2, an exemplary cylinder head is shown and generally identified at reference numeral 10. The cylinder head 10 is incorporated into an internal combustion engine 20 having an engine block 22 incorporating one or more cylinders 26. A piston 30 is supported for reciprocal movement within a cylinder 26 defined in the engine block 22. The cylinder head 10, cylinder 26 and piston 30 cooperate to define a combustion chamber 32. The exemplary internal combustion engine 20 includes two intake ports 40 and two exhaust ports 42. As is known, the intake and exhaust ports 40 and 42 open and close via valves to provide fluid communication between the cylinder and the intake manifold and the exhaust manifold (not specifically shown). It will be appreciated that while two intake ports 40 and two exhaust ports 42 are shown, the internal combustion engine 20 may incorporate any number of intake and/or exhaust valves. By way of example only the engine block 22 can be configured to have four cylinders. It will be appreciated that the methods and control strategies discussed herein can be applicable to TJI engines having different amounts of cylinders.

The cylinder head 10 includes a pre-chamber 50 having a pre-chamber insert 52 disposed therein. A first ignition device or spark plug 54 is disposed in the pre-chamber 50. The pre-chamber insert 52 defines a plurality of small orifices 56 defined therein. The orifices 56 provide communication between the pre-chamber 50 and the combustion chamber 32. An injector, not specifically shown, can deliver fuel into the pre-chamber 50. The first spark plug 54 can ignite the fuel in the pre-chamber 50.

A second ignition device or spark plug 60 is disposed in an adjacent cavity 62 provided on the cylinder head 10. In some implementations the second spark plug 60 can be referred to as a side spark plug. Once ignited, the fuel is forced through the orifices 56 of the pre-chamber insert 52. Flame is initiated inside the pre-chamber 50 and jets into the main combustion chamber 32 to ignite the bulk fuel air mixture.

Figure 3:
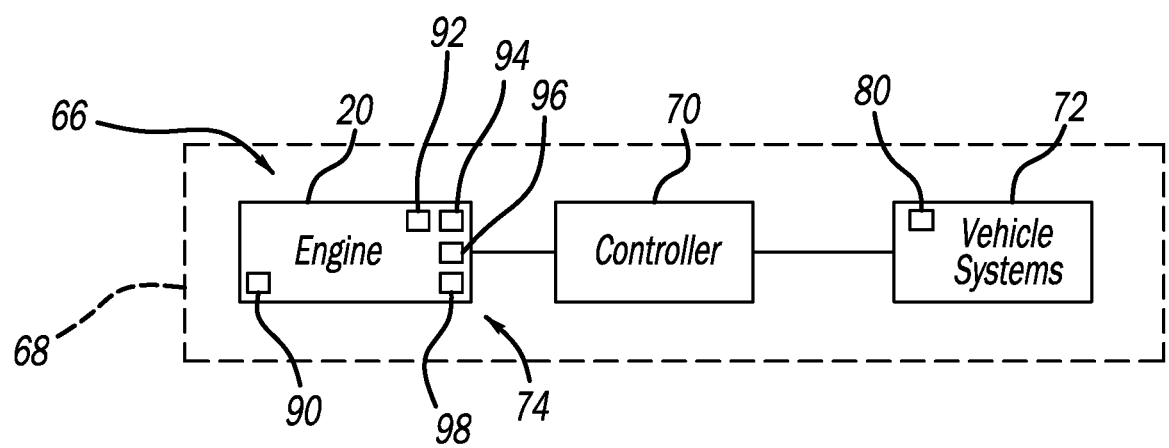
FIG. 3 is a schematic diagram of an engine system incorporating a controller that implements various control methods according to the present disclosure.

With additional reference now to FIG. 3, a combustion control system 66 for a vehicle 68 is shown having an engine control unit or controller 70 that communicates signals between the engine 20 and various vehicle systems 72. The controller 70 can receive various input signals from vehicle systems 72 and sensors 74. The vehicle systems can include, but are not limited to, a heating venting and air conditioning (HVAC) system, an accelerator pedal 80, and an alternator. For example, a driver of the vehicle 68 could provide input via an accelerator pedal 80, which is indicative of a torque request. The sensors 74 can include an air charge sensor 90, an intake camshaft position sensor 92, an exhaust camshaft position sensor 94, an engine speed sensor 96 and an engine coolant temperature (ECT) sensor 98.

The engine 20 draws air into an intake manifold through an induction system that is regulated by a throttle valve. A mass air flow (MAF) and/or a manifold absolute pressure (MAP) sensor and an intake air temperature (IAT) collectively comprise the air charge sensor 90. The air charge sensor 90 measures air flow/pressure indicative of a mass of as well as a temperature of an air charge being provided to each of the plurality of cylinders 26 in the engine 20. While illustrated and described as a single air charge sensor 90, it will be appreciated that there could be multiple sensors (e.g., a MAF and/or a MAP sensor in addition to an IAT sensor). Air mass, for example, could be determined or estimated using an air charge model that models mass based on intake air flow and/or air pressure, and potentially other parameters. The intake camshaft position sensor 92 measures a position of an intake camshaft (not shown) of the engine 20. The exhaust camshaft position sensor 94 measures a position of an exhaust camshaft (not shown) of the engine 20. The engine speed sensor 96 measures a rotational speed of a crankshaft of the engine 20. The ECT sensor 98 measures a temperature of a coolant (water, oil, etc.) flowing through and thereby cooling the engine 20.

The controller 70 controls operation of the engine 20. The controller 70 is configured to receive input from the vehicle systems 72 and the sensors 74. The controller 70 then controls the engine 20 (e.g., airflow, fuel, and spark) to achieve the torque request. In general, the controller 70 is configured to determine a spark model which computes optimal ignition setpoints based on fuel economy, emissions, knock and noise vibration harshness (NVH). The controller then can use the spark model as inputs for a torque model. The controller 70 can determine a torque model or torque request to the engine 20 based on various conditions, such as indicated from the vehicle systems 72 to achieve the desired engine torque requested by the driver. A torque model for a conventional engine with a single spark plug in each cylinder (or multiple spark plugs firing concurrently) uses a single delta spark to estimate engine torque. The delta spark is a difference between a maximum brake torque (MBT) spark timing and an actual spark timing. The MBT spark timing is output by the spark model. Such traditional spark models are unsatisfactory for TJI engines having two independent ignition timings.

As explained above, prior art methods of determining spark are not ideal for a TJI engine because a TJI engine has both a pre-chamber ignition from the first spark plug 54 and a secondary ignition from the second spark plug 62. As will be described in greater detail herein, the instant systems, methods and techniques allow the independent control of the pre-chamber spark timing using the first spark plug 54 and the secondary spark timing using the second spark plug 60. In this way, the methods disclosed by the instant disclosure account for both the pre-chamber spark timing from the first spark plug 54 and the secondary spark timing using the second spark plug 60.

According to the instant disclosure, MBT spark timing is defined as the initiated spark timing to reach MBT. For example, when the first spark plug 54 of the pre-chamber 50 initiates combustion earlier than the secondary spark from the second spark plug 60, then the MBT spark timing is the pre-chamber spark timing reaching MBT. Similarly, when the secondary spark from the second spark plug 60 initiates combustion earlier than the first spark plug 54 in the pre-chamber 50, then the MBT spark timing is the secondary spark timing reaching MBT. By way of example, if the pre-chamber 50 initiates combustion earlier than the secondary spark, the delta spark is calculated as the difference between the MBT and the pre-chamber 50 spark timing.

The timing of the pre-chamber spark ignition (firing of the first spark plug 56) and the secondary spark ignition (firing of the second spark plug 60) are controlled independently by a controller 70. As used herein, the term "spark stagger" is used to refer to the pre-chamber ignition timing minus the secondary spark plug ignition timing. If spark stagger is positive, the controller 70 determines that the pre-chamber 50 has initiated the combustion and the secondary spark fires after. Similarly, if spark stagger is negative, the controller 70 determines that the secondary spark initiates combustion. Stagger between the pre-chamber 50 and the secondary spark ignition timing will be determined with consideration of burn rate, fuel economy, combustion stability and other factors at each engine operating condition.

A remote calibration system that is not part of the vehicle 68 comprises a computer system that interacts with a dynamometer (not shown), which could be part of or separate from the calibration system, to obtain dynamometer data for the engine 20, which is utilized to generate an ANN calibration that is provided as input to the controller 70 and then utilized for spark and torque control. The term "obtain" as used herein refers to all of the generated ANN calibration being transmitted to the controller 70 for storage in its memory and subsequent retrieval for usage.

The ANN is designed such that it is capable of accurately controlling both the pre-chamber and the secondary spark in the TJI engine. This design process involves the selection of various parameters, such as, but not limited to, input/output type and quantity, number of hidden layers, number of neurons per layer, and training/transfer functions. In one exemplary implementation, the optimal ANN design is six inputs (air charge mass/temperature, engine speed, intake/exhaust camshaft positions, and ECT), two outputs (base, or pre-chamber, and MBT spark timing), two hidden layers, twelve neurons per layer, a Bayesian regularization backpropagation training function (also known as "trainbr"), and a hyperbolic tangent sigmoid transfer function (also known as "tansig"). It will be appreciated, however, that this is merely one exemplary ANN design and that these parameters could vary depending on the specific vehicle/engine application. For example only, another suitable training function, such as a Levenberg-Marquardt backpropagation training function (also known as "trainlm"), and/or another suitable transfer function, such as rectified linear units (also known as "ReLu"), could be utilized. Other suitable types and/or quantities of inputs and/or outputs could also be utilized. As previously mentioned, in one exemplary implementation, a PQ activation function could be implemented to further reduce processor throughput. In another exemplary implementation, as described herein, the optimal ANN design is seven inputs that adds an additional stagger mapping input. In a second exemplary implementation, as defined below, a spark stagger is added as a seventh input.

The ANN could be trained, for example, by an external calibration system using dynamometer data for the SI engine that is collected by the external calibration system during a calibration period of the vehicle. In one exemplary implementation, the external calibration system is configured to collect all necessary nominal and off-nominal calibration data during an initial first calibration sub-period, thereby eliminating the need to collect calibration data during a second calibration sub-period typically reserved for off-nominal calibration data collection up until vehicle launch.

A remote calibration system that is not part of the vehicle 68 comprises a computer system that interacts with a dynamometer (e.g., dynamometer sensors), which could be part of or separate from the calibration system, to obtain dynamometer data for the engine 20, which is utilized to generate an ANN calibration that is provided as input to the controller 70 and then utilized for combustion phasing control. The term "obtain" as used herein refers to all of the generated ANN calibration being transmitted to the controller 70 for storage in its memory and subsequent retrieval for usage. The ANN is designed such that it is capable of accurately estimating spark for subsequent combustion control in an SI engine. This design process involves the selection of various parameters, such as, but not limited to, input/output type and quantity, number of hidden layers, number of neurons per layer, and activation/transfer functions. In one exemplary implementation, the trained ANN defines 12×12 neurons per layer (FIG. 4), while it will be appreciated that a slightly larger trained ANN could be utilized (e.g., 13×13 neurons per layer (FIG. 5)) at the cost of slightly increased processor throughput.

Figure 4:
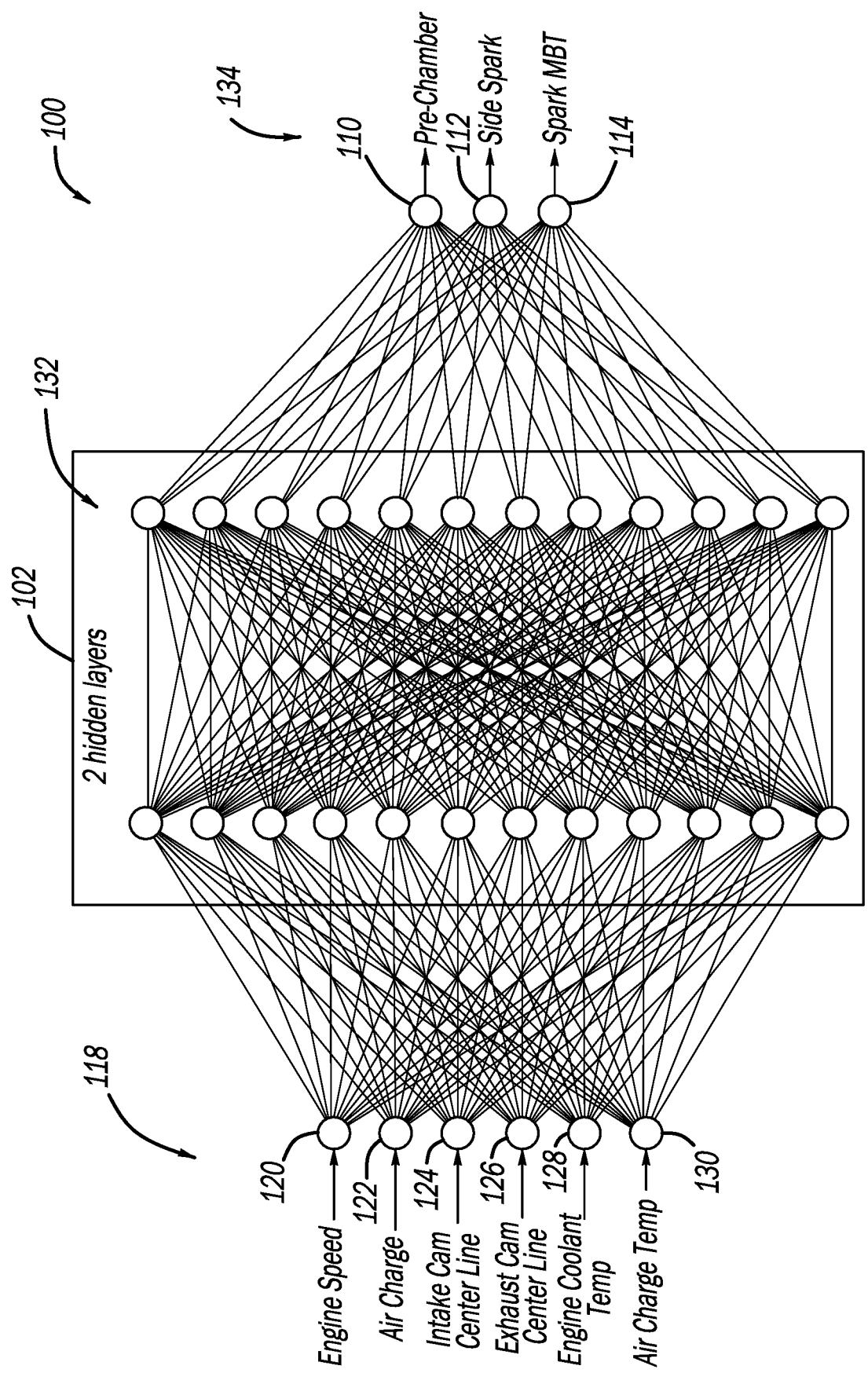
FIG. 4 is a flow diagram of an example spark estimation diagram according to one example of the present disclosure.

With reference to FIG. 4, a first spark control or model implemented by the controller 70 is shown and generally identified at reference 100. In general, the spark model 100 uses an ANN 102 to estimate timing of a pre-chamber spark 110, a secondary spark 112 and a maximum brake torque (MBT) spark 114. The ANN 102 uses an input layer 118 having six inputs including engine speed 120, air charge per cylinder per cycle 122, intake cam location 124, exhaust cam location 126, engine coolant temperature 128 and intake air charge temperature 130. The ANN 102 determines optimal spark value with the two ignition setpoints based on fuel economy, emissions, knock and noise vibration and harshness (NVH). In examples, the engine speed 120 can be provided by the engine speed sensor 96, the air charge 122 and the air charge temperature 130 can be provided by the air charge sensor 90, the intake cam location 124 can be provided by the intake camshaft position sensor 92, the exhaust cam location 126 can be provided by the exhaust camshaft position sensor 94, the ending speed 120 can be provided by the engine speed sensor 96, and the engine coolant temperature 128 can be provided by the ECT sensor 98. The ANN 102 is defined by four layers including the input layer 118, two hidden layers 132 with twelve neurons per layer, and an output layer 134 including a pre-chamber spark 110, a secondary spark 112 and a maximum brake torque (MBT) spark 114.

Figure 5:
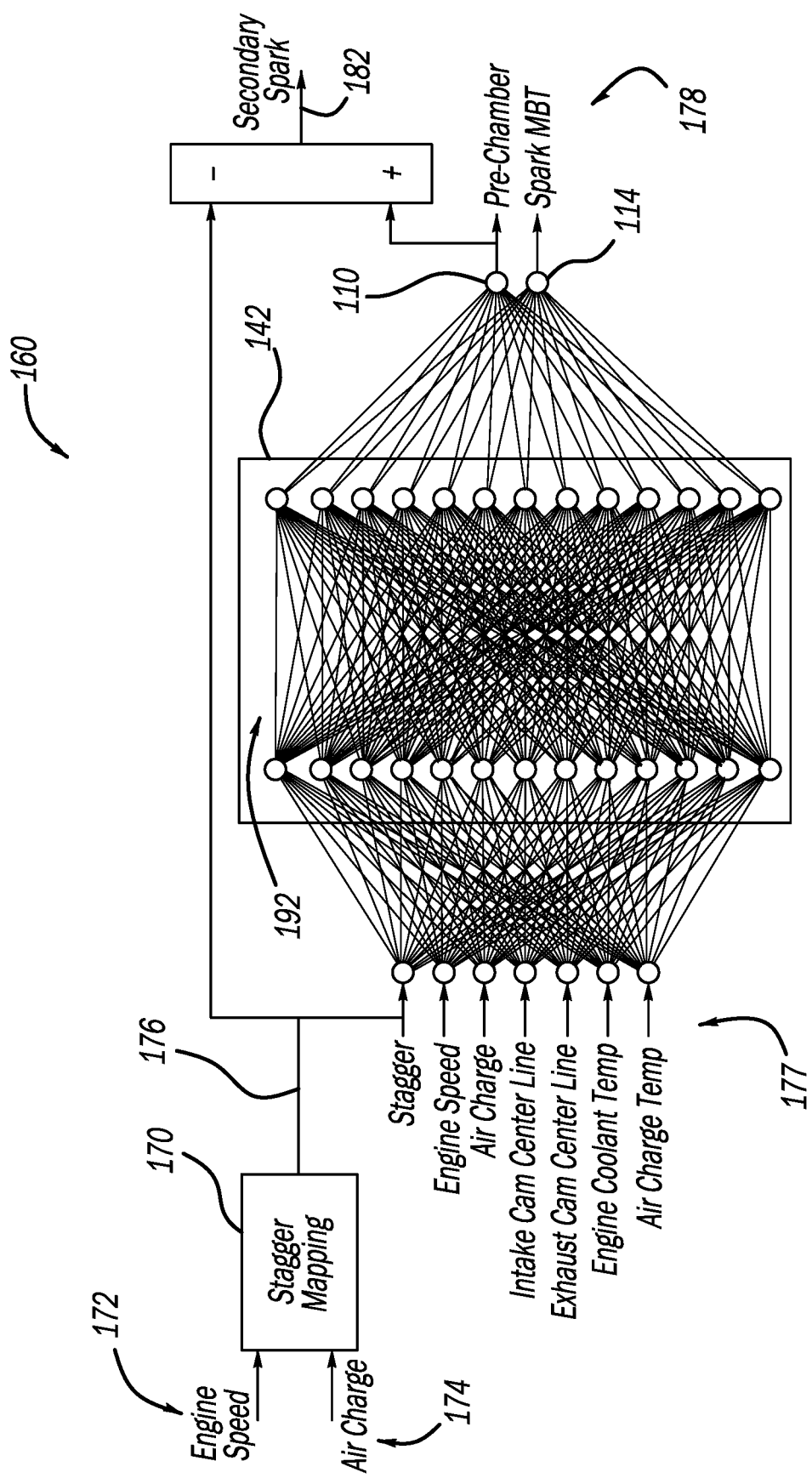
FIG. 5 is a flow diagram of an example spark estimation diagram according to another example of the present disclosure.

With reference to FIG. 5, a second spark control or model implemented by the controller 70 is shown and generally identified at reference 160. In general, the spark model 160 uses an ANN 142 to estimate timing of a pre-chamber spark 110, and a maximum brake torque (MBT) spark 114. The second spark control 160 uses stagger mapping 170 as a pre-calibrated training dataset. Stagger mapping 170 can output a stagger 176 based on an engine speed 172 and an air charge 174. The model can be retrained for any stagger changes to the engine map. The second spark control 160 improves the robustness of stagger changes by adding stagger as an extra input 176 to an input layer 177 of the neural network 142. In this regard, only pre-chamber spark 110 and spark MBT 114 are retained as outputs in an output layer 178 of the neural network 142.

Secondary spark 182 is calculated by subtracting stagger 176 from pre-chamber spark timing 110. The second spark control 160 provides stagger mapping 170 upstream (as an input) of the ANN 142 to calibrate stagger on the engine map. The seven input ANN spark model will protect the stagger changes upstream as the ANN 142 is trained with DOE datasets varying stagger, engine speed, air charge, intake and exhaust cam positions, coolant temperature and air charge temperature. The trained feedforward artificial neural network 142 is defined by four layers including the input layer 177, two hidden layers 192 with thirteen neurons per layer, and the output layer 178 including the pre-chamber spark 110, and the maximum brake torque (MBT) spark 114.

The ANN 142 uses seven inputs including engine speed 120, air charge per cylinder per cycle 122, intake cam location 124, exhaust cam location 126, engine coolant temperature 128, intake air charge temperature 130 and stagger 176. The ANN 142 determines optimal spark value with the two ignition setpoints based on fuel economy, emissions, knock and noise vibration and harshness (NVH). In examples, the engine speed 120 can be provided by the engine speed sensor 96, the air charge 122 and the air charge temperature 130 can be provided by the air charge sensor 90, the intake cam location 124 can be provided by the intake camshaft position sensor 92, the exhaust cam location 126 can be provided by the exhaust camshaft position sensor 94, the ending speed 120 can be provided by the engine speed sensor 96, and the engine coolant temperature 128 can be provided by the ECT sensor 98.

Both of the ANN's 102 and 142 capture the non-linear relationship among input factors. The results show improvement in spark control accuracy especially at off-nominal cam positions and off-nominal temperatures. With two spark timings to control (pre-chamber and side spark in the TJI engine), the ANN control models 100 and 160 significantly reduce the calibration efforts needed in the spark model.

Referring now to FIG. 7, an example flow diagram of an example torque estimation control method 200 according to the principles of the present disclosure is illustrated. While the method 200 is described with respect to the exemplary TJI engine 20, it will be appreciated that the method could be applicable to any TJI engine. Control begins at 212. At 214 control determines whether a torque command has been received by the vehicle system 72. In this example, control determines whether a torque command has been received by the accelerator pedal 80 at 214. If a torque command has not been received, control loops to 214. If a torque command has been received, control begins the torque model at 220. At 222, the controller 70 determines whether the engine 20 is a TJI engine. If the engine is not a TJI engine, the method returns at 224. If control determines that the engine 20 is a TJI engine, the controller 70 commands MBT spark from the TJI spark model at 230. When using the spark control 100 (FIG. 3), control proceeds through 234 and 236. Alternatively, when using the spark control 160 (FIG. 4), control proceeds through 244 and 246.

Figure 6:
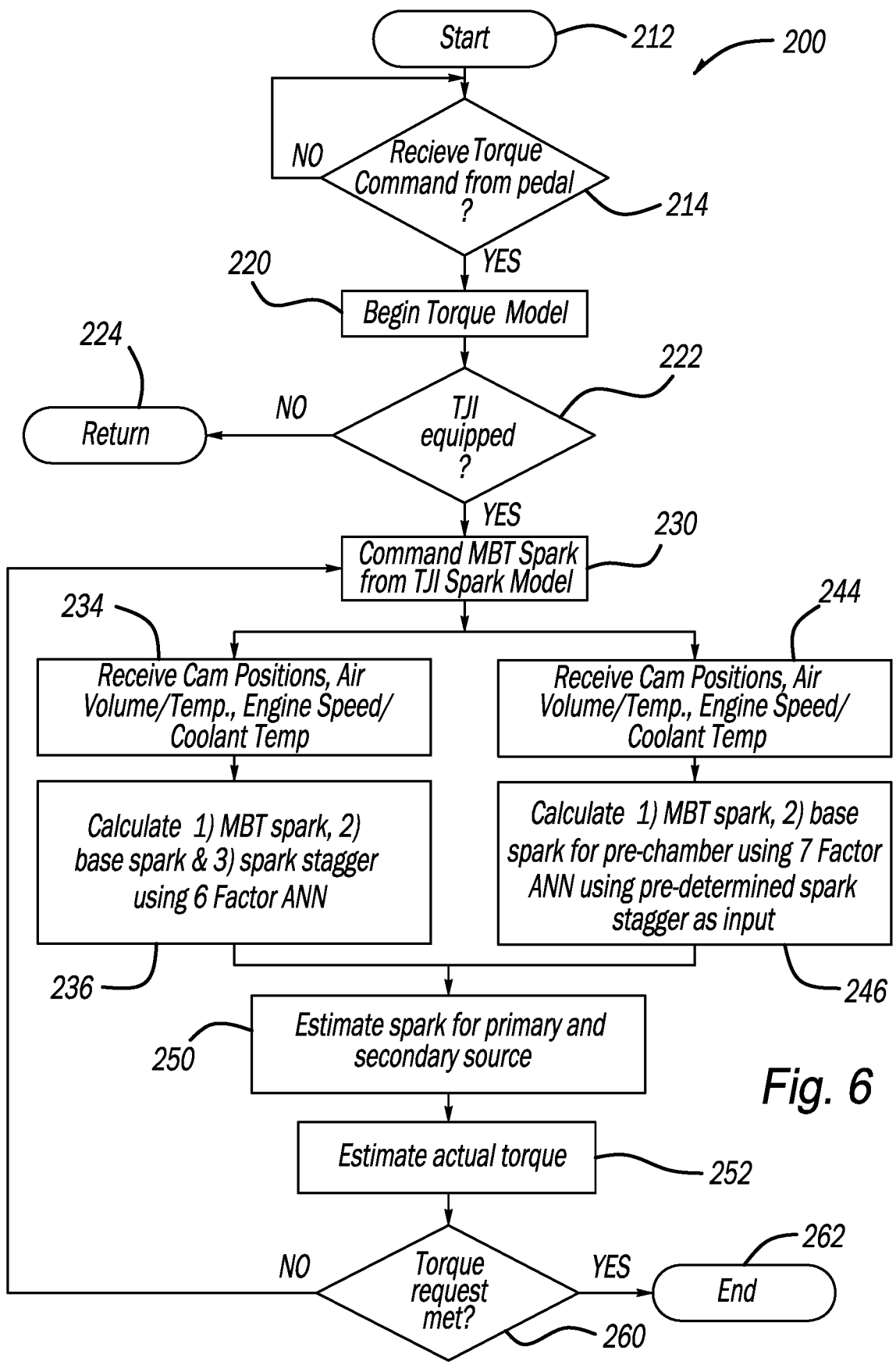
FIG. 6 is a flow diagram of an example torque estimation control method according to the principles of the present disclosure.

At 234 and 244, control receives the intake and exhaust cam positions 124, 126; the air volume and temperature 122, 130; the engine speed 120 and the engine coolant temperature 128. At 236, control calculates pre-chamber spark 110, side spark 112 and spark MBT 114 using the six factor ANN 102 described above. Alternatively, at 246, control calculates pre-chamber spark 110, side spark 112 and spark MBT 114 using the seven factor ANN 142 using pre-determined spark stagger as an additional input described above. Control estimates spark for the pre-chamber spark and the side spark at 250. Control estimates actual torque at 252. Control then determines whether the torque request has been met at 260. If the torque request has not been met, control loops to 230. If the torque request has been met, control ends at 262. It will be appreciated that alternatively, control can loop to 214 for continuous control. The techniques described above with respect to FIG. 6 include optional steps related to torque modelling. It will be appreciated that the instant disclosure is specifically directed toward determining spark values with two ignition setpoints. In this regard, the torque techniques are merely exemplary in nature and generally outside the scope of this disclosure.

It will be appreciated that the term "controller" as used herein refers to any suitable control device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A combustion control system for a turbulent jet ignition (TJI) engine having a first ignition device disposed in a pre-chamber of a cylinder head and a second ignition device disposed for communication with a main combustion chamber, the system comprising:
a set of sensors configured to measure operating parameters; and
a controller configured to:
access a trained feedforward artificial neural network (ANN) configured to model a first spark from the first ignition device, and maximum brake torque (MBT) spark based on the operating parameters;
generate the first spark, and the MBT spark for the engine using the ANN with the measured operating parameters from the set of sensors as inputs;
generate a second spark for the second ignition device;

determine a target spark timing for the engine based on at least one of the first spark, second spark and MBT spark.

2. The system of claim 1, wherein the controller is further configured to determine a spark stagger corresponding to a difference between the first and second spark timing.

3. The system of claim 2, wherein the spark stagger is based on a two-dimensional surface having engine speed and air charge mass as inputs.

4. The system of claim 3, wherein the controller is further configured to access the ANN that is further configured to additionally model the spark stagger.

5. The system of claim 4, wherein the controller is further configured to generate the first spark, and the MBT spark for the engine using the ANN with the measured parameters from the set of sensors and the spark stagger as inputs.

6. The system of claim 5, wherein the second spark is generated based on a difference between the spark stagger and the first spark timing.

7. The system of claim 2, wherein the ANN is defined by four layers including an input layer, two hidden layers with thirteen neurons per layer, and an output layer.

8. The system of claim 1, wherein the operating parameters comprise at least six parameters including air charge mass and temperature, intake and exhaust camshaft positions, engine speed, and engine coolant temperature.

9. The system of claim 1, wherein the second spark is modeled from the ANN.

10. The system of claim 9, wherein the ANN is defined by four layers including an input layer, two hidden layers with twelve neurons per layer, and an output layer.

11. A combustion control method for a turbulent jet ignition (TJI) engine having a first ignition device disposed in a pre-chamber of a cylinder head and a second ignition device disposed for communication with a main combustion chamber, the method comprising:
receiving, by a controller and from a set of sensors, measured engine operating parameters;
accessing, by the controller, a trained feedforward artificial neural network (ANN) configured to model a first spark from the first ignition device, and maximum brake torque (MBT) spark based on operating parameters;
generating, by the controller, the first spark, and the MBT spark for the engine using the ANN with the measured parameters from the set of sensors as inputs;
generating, by the controller, a second spark for the second ignition device;
determining, by the controller, a target spark timing for the engine based on at least one of the first spark, second spark and MBT spark.

12. The method of claim 11, further comprising generating, by the controller, the second spark using the ANN.

13. The method of claim 12, wherein the ANN is defined by four layers including an input layer, two hidden layers with twelve neurons per layer, and an output layer.

14. The method of claim 11, further comprising determining, by the controller, a spark stagger corresponding to a difference between the first and second spark timing.

15. The method of claim 14, wherein the spark stagger is based on a two-dimensional surface having engine speed and air charge mass as inputs.

16. The method of claim 15, further comprising accessing, by the controller, the ANN that is further configured to additionally model the spark stagger.

17. The method of claim 16, further comprising generating, by the controller, the first spark, and the MBT spark for the engine using the ANN with the measured parameters and the spark stagger as inputs.

18. The method of claim 17, wherein the operating parameters comprise at least six parameters including air charge mass and temperature, intake and exhaust camshaft positions, engine speed, and engine coolant temperature.

19. The method of claim 17, wherein the second spark is generated based on a difference between the spark stagger and the first spark timing.

20. The method of claim 18, wherein the ANN is defined by four layers including an input layer, two hidden layers with thirteen neurons per layer, and an output layer.

* * * * *